United States Patent [19]

Mark

[11] Patent Number: 4,501,875
[45] Date of Patent: Feb. 26, 1985

[54] POLYCARBONATE FROM CARBONYL HALIDE, BISCHLOROFORMATE AND DIHYDRIC PHENOL

[75] Inventor: Victor Mark, Evansville, Ind.

[73] Assignee: General Electric Company, Mt. Vernon, Ind.

[21] Appl. No.: 410,311

[22] Filed: Aug. 23, 1982

[51] Int. Cl.$^3$ .............................................. C08G 63/62
[52] U.S. Cl. ...................................... 528/196; 525/462; 528/171; 528/174; 528/370
[58] Field of Search ................................. 528/196, 370

[56] References Cited

U.S. PATENT DOCUMENTS

| | | | |
|---|---|---|---|
| 3,030,335 | 4/1962 | Goldberg | 528/196 |
| 3,493,534 | 2/1970 | Coury et al. | 528/196 |
| 4,381,358 | 4/1983 | Rosenquist | 524/114 |

*Primary Examiner*—Harold D. Anderson
*Attorney, Agent, or Firm*—Myron B. Kapustij; Martin B. Barancik

[57] ABSTRACT

Novel carbonate polymers exhibiting improved processability comprised of the polymerized reaction products of (i) at least one dihydric phenol, (ii) a carbonyl halide carbonate precursor, and (iii) at least one specific bishaloformate. The bishaloformate is selected from bishaloformates represented by the general formulae

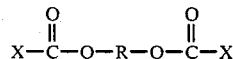

and/or

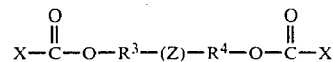

wherein:

X is independently selected from chlorine and bromine radicals;

R is selected from alkylene radicals, cycloalkylene radicals, and divalent hydrocarbon radicals;

$R^3$ and $R^4$ are independently selected from alkylene radicals; and

Z is selected from the following divalent radicals

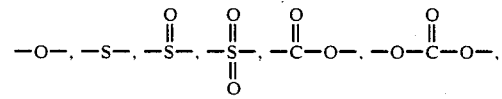

the $-(R^6)_d-Ar-(R^7)_e-$ radical wherein Ar represents a divalent mono-, di- or polynuclear aromatic residue, $R^6$ and $R^7$ are independently selected from alkylene radicals, and d and e are independently selected from zero and one, and a divalent organic aliphatic hetero non-cyclic radical containing at least one carbon atom and at least one hetero group selected from

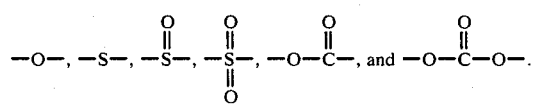

The instant polycarbonates are useful in making films, glazing sheets, fibers, and molded articles.

14 Claims, No Drawings

POLYCARBONATE FROM CARBONYL HALIDE, BISCHLOROFORMATE AND DIHYDRIC PHENOL

BACKGROUND OF THE INVENTION

Polycarbonates are well known thermoplastic materials which, due to their many advantageous properties, find use as thermoplastic engineering materials in many commercial and industrial applications. The polycarbonates exhibit, for example, excellent properties of transparency combined with toughess, flexibility, impact resistance and high heat distortion temperatures. The polycarbonates and their preparation are disclosed, for example, in U.S. Pat. Nos. 3,028,365; 3,334,154; 3,275,601 and 3,915,926. However, due to their relatively high melt viscosities the carbonate polymers need relatively high processing temperatures. It would thus be very advantageous if polycarbonates could be provided which while retaining substantially all of their other advantageous properties were also easier to process, i.e., exhibited lower melt viscosities.

It is, therefore, an object of this invention to provide carbonate polymers which exhibit improved processability and at the same time retain substantially all or most of the other advantageous properties of polycarbonates.

SUMMARY OF THE INVENTION

In accordance with the instant invention there are provided novel carbonate polymers which exhibit improved processability while simultaneously retaining substantially all or most of their other advantageous properties such as transparency, toughness, impact strength, flexibility and the like.

These novel carbonate polymers are comprised of the polymerized reaction products of: (i) at least one dihydric phenol; (ii) a carbonyl halide carbonate precursor; and (iii) at least one particular bishaloformate.

DESCRIPTION OF THE INVENTION

It has been discovered that carbonate polymers can be obtained which exhibit improved processability and improved impact strength, particularly improved thick section impact strength, while at the same time retaining substantially all or most of their other advantageous properties such as transparency, toughness, flexibility, and the like.

The carbonate polymers of the instant invention are comprised of the polymerized reaction products of: (i) at least one dihydric phenol; (ii) a carbonyl halide carbonate precursor; and (iii) at least one bishaloformate selected from bishaloformates represented by the following general formulae:

I. 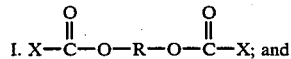 and

II. 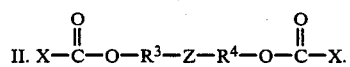

In Formula I X is independently selected from chlorine and bromine radicals. R in Formula I represents a divalent aliphatic hydrocarbon radical containing from 1 to about 30 carbon atoms. This divalent aliphatic hydrocarbon radical is selected from:

(i) alkylene radicals containing from 1 to about 30 carbon atoms.

(ii) cycloalkylene radicals containing from 4 to about 30 carbon atoms represented by the general formula

    Ia.

wherein $R^5$ is independently selected from alkyl radicals, preferably alkyl radicals containing from 1 to about 5 carbon atoms, A represents a cycloalkylene radical containing from 4 to about 16 carbon atoms in the cyclic structure, and p is a whole number having a value of from 0 to the number of replaceable hydrogens present on A, preferably a whole number having a value of from 0 to 4 inclusive; and (iii) divalent radicals represented by the general formula

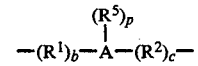    Ib.

wherein $R^1$ and $R^2$ are independently selected from alkylene radicals containing from 1 to about 20 carbon atoms, the letters b and c independently represent zero or one, with the proviso that the sum of b and c is at least one, and $R^5$, A, and p are as defined hereinafore.

In Formula II X is independently selected from chlorine and bromine radicals. $R^3$ and $R^4$ in Formula II are independently selected from divalent aliphatic hydrocarbon radicals containing from 1 to about 30 carbon atoms. These divalent aliphatic hydrocarbon radicals are selected from:

(i) alkylene radicals containing from 1 to about 30 carbon atoms;

(ii) cycloalkylene radicals containing from 4 to about 30 carbon atoms represented by Formula Ia; and (iii) divalent radicals represented by Formula Ib.

Z in Formula II is selected from:

(i) the —O— radical;

(ii) the —S— radical;

(iii) the $-\overset{\overset{\displaystyle O}{\|}}{S}-$ radical;

(iv) the $-\overset{\overset{\displaystyle O}{\|}}{\underset{\underset{\displaystyle O}{\|}}{S}}-$ radical (v) the $-\overset{\overset{\displaystyle O}{\|}}{C}-$ radical;

(vi) the $-O-\overset{\overset{\displaystyle O}{\|}}{C}-$ radical;

(vii) the $-O-\overset{\overset{\displaystyle O}{\|}}{C}-O-$ radical;

(viii) the $-(R^6)_d-Ar-(R^7)_e-$ radical wherein Ar represents a divalent mono-, di- or polynuclear aromatic radical, preferably one containing from 6 to 18 carbon atoms, $R^6$ and $R^7$ are independently selected from alkylene radicals containing from 1 to about 10 carbon atoms, and the letters d and e are independently selected from zero or one; and (ix) a divalent organic aliphatic hetero non-cyclic radical containing at least one carbon atom and at least one hetero group selected from

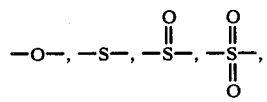

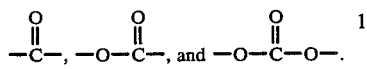

The alkylene radicals represented by R, $R^3$ and $R^4$ can be either branched alkylene radicals or straight chain alkylene radicals. Preferably, alkylene radicals containing more than about 20 carbon atoms are branched alkylene radicals. It is preferred that when branching occurs that the branching groups be lower alkyl radicals, i.e., alkyl radicals containing from 1 to about 5 carbon atoms.

The alkylene radicals represented by $R^1$ and $R^2$ may likewise be straight chain alkylene radicals or branched alkylene radicals.

Some illustrative non-limiting examples of straight chain alkylene radicals include ethylene, 1,3-propylene, 1,4-butylene, 1,5-pentylene, 1,8-octylene, 1,10-decylene, 1,12-dodecylene, 1,16-hexadecylene, 1,20-eicosylene, and the like.

Some illustrative non-limiting examples of branched alkylene radicals include

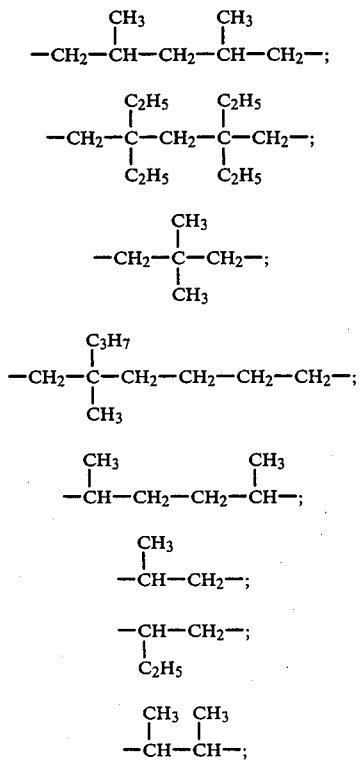

and the like.

Some illustrative non-limiting examples of the cycloalkylene radicals of Formula Ia include 1,3-cyclobutylene, 1,3-cyclopentylene, 1,4-cyclohexylene, 2-methyl-1,4-cyclohexylene, 1,4-dimethyl-1,4-cyclohexylene, cyclooctylene, and the like.

Some illustrative non-limiting examples of the divalent radicals of Formula Ib include

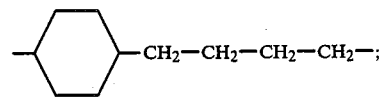

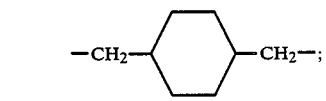

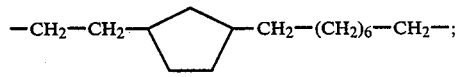

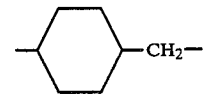

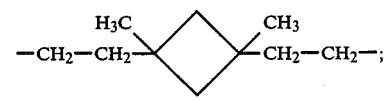

and the like.

Some non-limiting illustrative examples of —$R^3$—Z—$R^4$— in Formula II, when Z represents —O—, include:

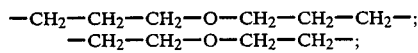

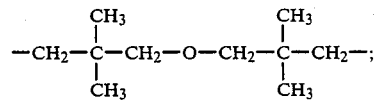

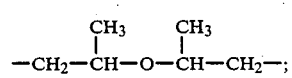

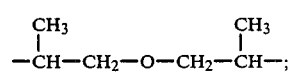

and the like.

Some non-limiting illustrative examples of —$R^3$—Z—$R^4$— in Formula II, when Z represents —S—, include:

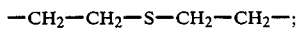

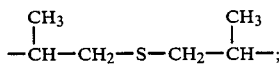

and the like.

Some illustrative non-limiting examples of —R$^3$—Z—R$^4$— in Formula II, when Z represents

include:

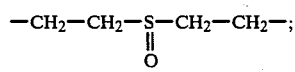

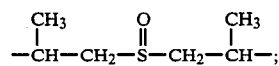

and the like.

Some illustrative non-limiting examples of —R$^3$—Z—R$^4$— in Formula II, when Z represents

include:

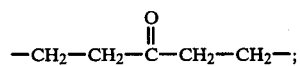

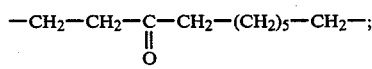

and the like.

Some illustrative non-limiting examples of —R$^3$—Z—R$^4$— in Formula II, when Z represents

include:

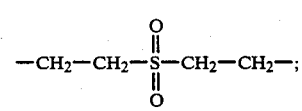

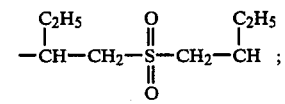

and the like.

When Z in Formula II represents —(R$^6$)$_d$—Ar—(R$^7$)$_e$— radicals it is preferred that the aromatic radicals represented by Ar be selected from phenylene, alkyl substituted phenylene, naphthylene, alkyl substituted naphthylene, biphenylene, and alkyl substituted biphenylene. When Ar represents an alkyl substituted phenylene, alkyl substituted naphthylene, or alkyl substituted biphenylene it is preferred that the substituent alkyl groups be lower alkyl groups, i.e., those alkyl groups containing from 1 to about 5 carbon atoms. It is further preferred that the number of alkyl substituent groups be no more than 2. R$^6$ and R$^7$ can be either straight chain alkylene groups or branched chain alkylene groups. If R$^6$ and R$^7$ are branched chain alkylene groups it is preferred that double branching, if present, occur at the beta carbon atom. It is further preferred that the branching groups be lower alkyl groups. Some illustrative non-limiting examples of radicals represented by —(R$^6$)$_d$—Ar—(R$^7$)$_e$— include:

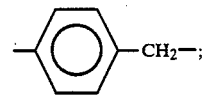

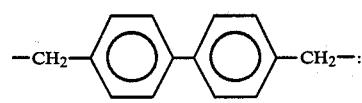

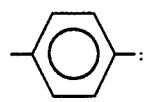

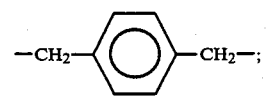

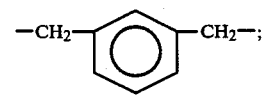

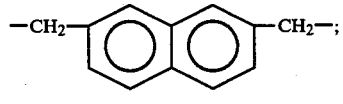

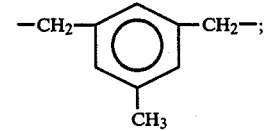

and the like.

Z in Formula II may also represent a divalent organic aliphatic hetero non-cyclic radical containing at least one carbon atom and at least one hetero group selected from

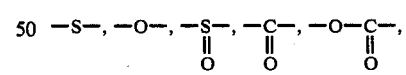

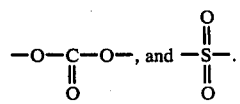

That is to say, Z may be a divalent organic organic radical which is linear and aliphatic in character and which contains in the linear backbone at least one carbon atom, i.e., a hydrocarbon group, and at least one hetero group, i.e., non-hydrocarbon group, of the type described hereinafore. While this divalent radical is generally linear in character, i.e., it does not contain cyclic groups, it is to be understood that minor amounts of branching may be present. The amount of branching that may be present in an amount that does not affect the linear character of the hetero backbone. The branching groups, if present, are preferably lower alkyl groups, i.e., alkyl groups containing from 1 to about 5 carbon atoms.

Illustrative of these divalent organic aliphatic non-cyclic hetero radicals are the divalent polyether residues. These divalent polyether residues may be represented by the general formula $$(-R^8-O-)_y \qquad \text{III.}$$

wherein $R^8$ is an alkylene radical, preferably a lower alkylene radical containing from 1 to about 5 carbon atoms, and y is a number from 2 to about 350.

Some illustrative non-limiting examples of the polyether residues represented by Formula III include:

(—CH$_2$—CH$_2$—O—)$_{4.5}$;
(—CH$_2$—CH$_2$—O—)$_9$;
(—CH$_2$—CH$_2$—O—)$_{23}$;
(—CH$_2$—O—)$_{62}$;
(—CH$_2$—CH$_2$—O—)$_{77}$;
(—CH$_2$—CH$_2$—O—)$_{155}$;
(—CH$_2$—CH$_2$—O—)$_{320}$; and the like.

Some other non-limiting illustrative examples of these divalent organic aliphatic non-cyclic hetero radicals include:

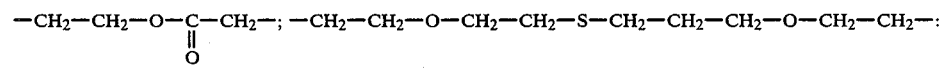

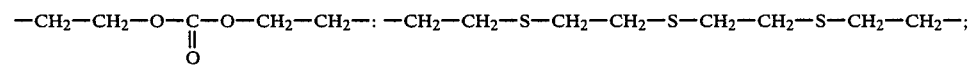

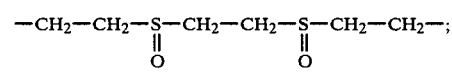

and the like.

The bishaloformates of Formulae I and II are known compounds which are either commercially available or may be readily prepared by known methods.

Thus, for example, one method of preparing the bishaloformates of Formulae I and II involves reacting two moles of a carbonyl halide of the formula

with one mole of a diol of the formula HO—R—OH or HO—R$^3$—Z—R$^4$—OH, wherein X, Z, R, R$^3$ and R$^4$ are as defined hereinafore.

Some illustrative non-limiting examples of the bishaloformates of Formulae I and II are set forth in Table I.

TABLE I

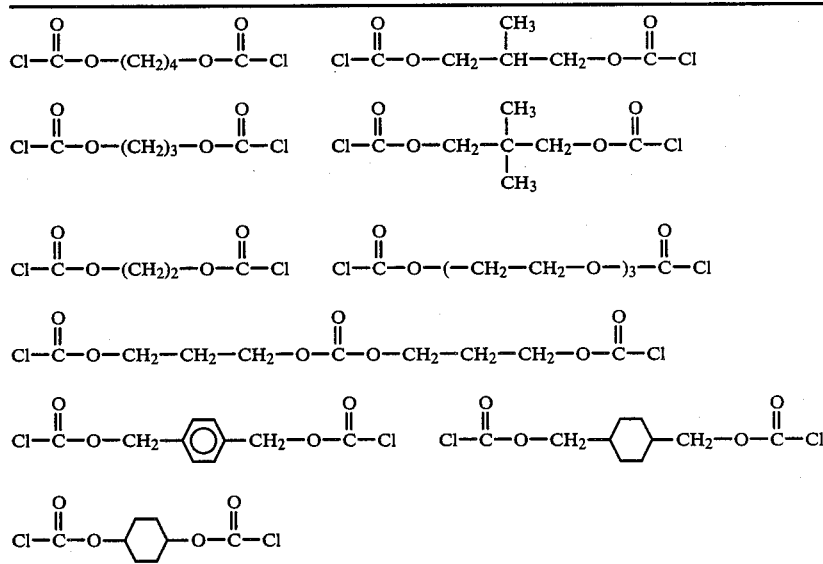

The dihydric phenols useful in the practice of the instant invention will in general conform to the general formula

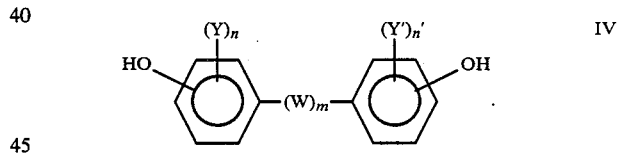

wherein:

Y is independently selected from halogen, monovalent hydrocarbon, and monovalent hydrocarbonoxy radicals;

Y' is independently selected from halogen, monovalent hydrocarbon, and monovalent hydrocarbonoxy radicals;

W is selected from divalent hydrocarbon radicals;

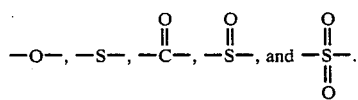

n and n' are independently selected from whole numbers having a value of from 0 to 4 inclusive; and m is either zero or one.

Preferred halogen radicals represented by Y and Y' are chlorine and bromine. The preferred monovalent hydrocarbon radicals represented by Y and Y' are those containing from 1 to about 12 carbon atoms, and are preferably selected from alkyl, aryl, alkaryl, and aralkyl radicals.

The preferred alkyl radicals are those containing from 1 to about 5 carbon atoms. The preferred aryl radicals are those containing from 6 to 12 carbon atoms, i.e., phenyl and naphthyl. The preferred aralkyl and alkaryl radicals are those containing from 7 to 11 carbon atoms.

The hydrocarbonoxy radicals represented by Y and Y' may be represented by the general formula $-OR^9$ wherein $R^9$ represents a monovalent hydrocarbon radical. The preferred hydrocarbonoxy radicals are the alkoxy and aryloxy radicals. The preferred alkoxy radicals are those containing from 1 to about 5 carbon atoms. The preferred aryloxy radicals are those containing from 6 to 12 carbon atoms.

The divalent hydrocarbon radical represented by W is preferably selected from alkylene radicals, alkylidene radicals, cycloalkylene radicals, and cycloalkylidene radicals.

Preferred alkylene radicals are those containing from 1 to about 8 carbon atoms. Preferred alkylidene radicals are those containing from 1 to about 8 carbon atoms. Preferred cycloalkylene and cycloalkylidene radicals are those containing a total of from about 5 to about 18 carbon atoms. These cycloalkylene and cycloalkylidene radicals may be represented by the general formula

 V.

wherein C represents a cycloalkylene or cycloalkylidene radical containing from 5 to 7 carbon atoms in the cyclic structure, $R^{10}$ is independently selected from alkyl radicals containing from 1 to about 4 carbon atoms, and t is a whole number having a value of from 0 to 4 inclusive.

In the dihydric phenol compounds represented by Formula IV, when more than one Y substituent is present they may be the same or different. The same is true for the Y' substituent. Where m is zero in Formula IV the aromatic rings are directly joined with no intervening alkylene or other bridge. The positions of the hydroxyl groups and Y or Y' on the aromatic nuclear residues can be varied in the ortho, meta or para positions and the groupings can be in a vicinal, asymmetrical or symmetrical relationship where two or more ring carbon atoms of the aromatic hydrocarbon residues are substituted with Y or Y' and hydroxyl groups.

Some illustrative non-limiting examples of the dihydric phenol compounds represented by Formula IV include:

2,2-bis(4-hydroxyphenyl)propane (bisphenol-A);
2,2-bis(4-hydroxy-3,5-dimethylphenyl)propane;
3,3-bis(4-hydroxyphenyl)pentane;
4,4-bis(4-hydroxyphenyl)heptane;
2,2-(3,5,3',5'-tetrachloro-4,4'-dihydroxydiphenyl)propane;
2,2-(3,5,3',5'-tetrabromo-4,4'-dihydroxydiphenyl)propane;
(3,3'-dichloro-4,4'-dihydroxydiphenyl)methane; bis(4-hydroxyphenyl)sulfone;
bis(4-hydroxyphenyl)sulfide;
bis(3,5-dimethyl-4-hydroxyphenyl)methane;
2,2-bis(3,5-dimethyl-4-hydroxyphenyl)propane;
1,1-bis(4-hydroxphenyl)cyclohexane;
1,4-bis(3,5-diethyl-4-hydroxyphenyl)cyclohexane;
bis(4-hydroxyphenyl)methane;
4,4'-dihydroxy-2,6-dimethyldiphenyl ether; and the like.

A variety of additional dihydric phenols are also available and may be used in the practice of the instant invention. Some of these additional dihydric phenols are disclosed in U.S. Pat. Nos. 2,999,835; 3,018,365 and 3,153,008, all of which are hereby incorporated herein by reference. It is, of course, possible to employ mixtures of two or more dihydric phenols, and where the term dihydric phenol is used herein it is to be understood that it encompasses mixtures of dihydric phenols as well as single dihydric phenol.

The carbonyl halides utilized as the carbonate precursors in the instant invention are carbonyl chloride, carbonyl bromide, or mixtures thereof. Carbonyl chloride, also known as phosgene, is the preferred carbonyl halide carbonate precursor.

The amount of the bishaloformate of Formula I and/or II employed is a processability improving amount. By processability improving amount is meant an amount effective to improve the processability of the polycarbonate resin, i.e., improve the melt flow of the resin, but insufficient to significantly adversely affect the other advantageous properties of the resin. Generally, this amount ranges from about 0.1 to about 15 mole percent, based on the amount of the dihydric phenol present, preferably from about 1 to about 10 mole percent, and more preferably from about 2 to about 8 mole percent. In general if the amount of the bishaloformate employed is less than about 0.1 mole percent there is only a slight decrease in the melt viscosity of the resin, i.e., there is only a slight improvement in the processability of the resin. If more than about 15 mole percent of the bishaloformate is employed the other properties of the resin, such as, for example, the heat distortion temperature or impact strength, begin to be significantly adversely affected.

Rather than employing just one bishaloformate of Formula I or one bishaloformate of Formula II it is possible to utilize mixtures of two or more of these bishaloformates. Thus, for example, it is possible to utilize mixtures of at least one bishaloformate of Formula I and at least one bishaloformate of Formula II, a mixture of two or more bishaloformates of Formula I, or a mixture of two or more bishaloformates of Formula II. Therefore, whenever the term bishaloformate is employed herein it is to be understood that this term encompasses mixtures of these bishaloformates as well as individual bishaloformates.

If a bishaloformate of Formula I is employed with a dihydric phenol of Formula IV the carbonate polymers of the instant invention will contain repeating units represented by the structures

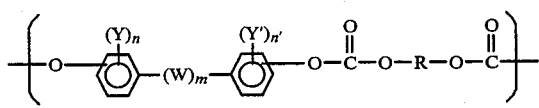

and

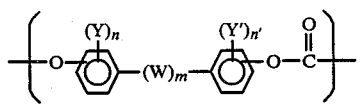

with structure V being present in minor amounts, i.e. processability improving amounts. The amount of structure V present will depend on the amount of the bishaloformate of Formula I which is reacted with the dihydric phenol of Formula IV and the carbonate precursor.

If a bishaloformate of Formula II is used the carbonate polymers will contain repeating units represented by Formula VI and

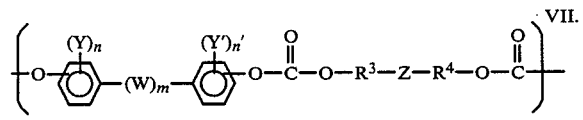

with structure VII being present in minor amounts, i.e., processability improving amounts. The amount of structure VII present will depend on the amount of the bishaloformate of Formula II which is reacted with the dihydric phenol of Formula IV and the carbonate precursor.

If a mixture of bishaloformates of Formulae I and II are utilized the carbonate polymer will contain repeating structural units V, VI, and VII, with units V and VII being present in minor amounts.

Also included within the scope of the instant invention are the high molecular weight thermoplastic randomly branched polycarbonates. These randomly branched polycarbonates are prepared by coreacting a minor amount of a polyfunctional organic compound with the aforedescribed dihydric phenol, bishaloformate of Formula I and/or II, and a carbonate precursor. The polyfunctional organic compounds useful in making the branched polycarbonates are disclosed in U.S. Pat. Nos. 3,635,895; 4,001,184 and 4,204,047, all of which are hereby incorporated herein by reference. These polyfunctional compounds are generally aromatic and contain at least three functional groups which may be hydroxyl, carboxyl, carboxylic anhydride, haloformyl or mixtures thereof. Some illustrative non-limiting examples of these polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzopheneonetetracarboxylic acid, benzophenonetetracarboxylic anhydride, and the like. Also included within the scope of the instant invention are blends of linear polycarbonates and branched polycarbonates.

One of the methods for preparing the high molecular weight aromatic carbonate polymers of the instant invention involves the heterogeneous interfacial polymerization system utilizing an aqueous caustic solution, an organic water immiscible solvent, at least one dihydric phenol of Formula IV, at least one bishaloformate of Formulae I and/or II, a catalyst, a molecular weight regulator, and a carbonyl halide carbonate precursor. A preferred heterogeneous interfacial polymerization system is one which utilizes phosgene as the carbonate precursor and methylene chloride or chlorobenzene as the organic solvent.

Another useful method for preparing the carbonate polymers of the instant invention involves the use of an organic solvent system wherein the organic solvent system may also function as an acid acceptor, at least one dihydric phenol of Formula IV, at least one bis(-haloformate of Formulae I and/or II, a molecular weight regulator, and a carbonyl halide carbonate precursor. A preferred method is one utilizing phosgene as the carbonate precursor and pyridine or triethylamine as the acid acceptor-solvent component.

Generally, in both of the aforedescribed methods, phosgene is passed into a reaction mixture containing, as essential reactants, at least one dihydric phenol of Formula IV and at least one bishaloformate of Formulae I and/or II.

The temperature at which the phosgenation reaction proceeds may vary from below 0° C. to above 100° C. The reaction proceeds satisfactorily at temperatures from room temperature (25° C.) to 50° C. Since the reaction is exothermic, the rate of phosgene addition may be used to control the reaction temperature.

A suitable acid acceptor may be either organic or inorganic in nature. A suitable organic acid acceptor is a tertiary amine and includes such materials as pyridine, triethylamine, trimethylamine, tributylamine, etc. The inorganic acid acceptor may be a hydroxide, a carbonate, a bicarbonate, a phosphate, and the like of an alkali or alkaline earth metal. An inorganic acid acceptor is preferred when an aqueous solvent system is utilized.

The catalysts which are employed can be any of the well known suitable catalysts that aid the polymerization reaction of the dihydric phenol, the bishaloformate, and the phosgene coreactants in the interfacial solvent system. Suitable catalysts include, but are not limited to, tertiary amines, quaternary phosphonium and ammonium compounds, amidines, and the like.

The molecular weight regulators employed may be any of the known compounds which regulate the molecular weight of the carbonate polymers by a chain stopping or terminating mechanism. These compounds include, but are not limited to, phenol, para-tertiarybutylphenol, and the like.

The amount of carbonyl halide carbonate precursor, such as phosgene, utilized is an amount effective to react with substantially all of the remaining unreacted hydroxyl groups of the bisphenols employed. This amount is referred to as a stoichiometric amount.

The high molecular weight aromatic carbonate polymers of the instant invention generally have a weight average molecular weight in the range of from about 5,000 to about 200,000, preferably from about 10,000 to about 100,000, and more preferably from about 25,000 to about 50,000.

The carbonate polymers of the instant invention may optionally have admixed therewith certain commonly known and used additives such as antioxidants; antistatic agents; glass fibers; fillers; ultraviolet radiation absorbers such as the benzophenones, the benzotriazoles, benzylidene malonates and the like; hydrolytic stabilizers such as the epoxides disclosed in U.S. Pat. Nos.

3,489,716; 4,138,379 and 3,839,247, all of which are hereby incorporated herein by reference; color stabilizers such as the organophosphites disclosed in U.S. Pat. Nos. 3,305,520 and 4,118,370, both of which are hereby incorporated herein by reference; and flame retardants.

Some particularly useful flame retardants are the alkali and alkaline earth metal salts of sulfonic acids. These types of flame retardants are disclosed in U.S. Pat. Nos. 3,933,734; 3,948,851; 3,926,908; 3,919,167; 3,909,490; 3,953,396; 3,931,100; 3,978,024; 3,953,399; 3,917,559; 3,951,910 and 3,940,366, all of which are incorporated herein by reference. When the carbonate polymers of the instant invention contain these aforementioned flame retardants admixed therewith, the amount of flame retardant present is a flame retardant amount, i.e., an amount effective to render said carbonate polymers flame retardant. Generally, this amount is in the range of from about 0.01 to about 10 weight percent of said flame retardant additive based on the weight of the polycarbonate resin composition.

Another embodiment of the instant invention is a blend of (i) at least one carbonate polymer obtained by the coreaction of at least one dihydric phenol described hereinafore, e.g., a dihydric phenol of Formula IV, at least one bishaloformate of Formulae I and/or II, and a carbonyl halide carbonate precursor (hereinafter referred to as carbonate polymer A); and (ii) at least one carbonate polymer obtained by coreacting a carbonate precursor and at least one dihydric phenol such as a dihydric phenol of Formula IV (Hereinafter referred to as carbonate polymer B). Illustrative of carbonate polymers B are those disclosed in U.S. Pat. Nos. 2,997,459; 3,028,365; 3,043,800; 3,275,601; and 3,915,926, all of which are hereby incorporated herein by reference.

These blends thus generally contain (i) at least one carbonate polymer A, i.e., carbonate polymer containing repeating structural units of Formulae VI and V and/or VII; and (ii) at least one carbonate polymer B, i.e., carbonate polymer containing repeating structural units of Formula VI.

In this embodiment, however, carbonate polymer A may be obtained by coreacting from about 0.1 to about 50 mole percent, based on the amount of dihydric phenol present, of at least one bishaloformate of Formulae I and/or II with a dihydric phenol, such as that of Formula IV, and a carbonyl halide carbonate precursor.

The instant blends exhibit improved processability while at the same time retaining substantially most of the other advantageous properties of polycarbonates.

Generally, these blends contain an amount of carbonate polymer A effective to improve the processability of the blend but insufficient to significantly deleteriously affect the other advantageous properties of the blend. This amount is generally in the range of from about 0.5 to about 25 weight percent, preferably from about 1 to about 15 weight percent, and more preferably from about 2 to about 10 weight percent.

These blends are generally prepared by preforming carbonate polymers A and B, and thereafter physically mixing or blending polymers A and B together.

The blends of this embodiment may further optionally contain admixed therewith the additives, such as the antioxidants, hydrolytic stabilizers, mold release agents, ultraviolet radiation absorbers, fillers, color stabilizers, flame retardants, and the like described hereinafore.

Yet another embodiment of the instant invention is a blend comprised of (i) at least one carbonate polymer B; and (ii) at least one carbonate polymer obtained by coreacting at least one bishaloformate of Formulae I and/or II with a dihydric phenol such as that of Formula IV (hereinafter referred to as carbonate polymer C).

Carbonate polymer C is obtained, in general, by coreacting one mole of at least one dihydric phenol such as that of Formula IV with one mole of at least one bishaloformate of Formulae I and/or II. The resultant carbonate polymer generally will contain repeating structural units of Formulae V and/or VII.

These blends exhibit improved processability while at the same time retaining substantially all or most of the other advantageous properties possessed by polycarbonates.

Generally, these blends contain an amount of carbonate polymer C effective to improve the processability of the blends but insufficient to substantially deleteriously affect the other advantageous properties of polycarbonates. This amount is generally in the range of from about 0.1 to about 15 weight percent, preferably from about 1 to about 10 weight percent.

These blends may generally be prepared by preforming the carbonate polymers B and C, and thereafter physically mixing or blending these preformed polymers B and C together. The blends of this embodiment may further optionally contain admixed therewith the various additives

PREFERRED EMBODIMENT OF THE INVENTION

In order to move fully and clearly illustrate the present invention the following examples are presented. It is intended that the examples be considered as illustrative rather than limiting the invnetion disclosed and claimed eherin. In the examples, all parts and percentages are on a weight basis unless otherwise specified.

EXAMPLE 1

This example illustrates a prior art polycarbonate resin falling outside the scope of the instant invention. This example is presented for comparative purposes.

Into a mixture of 2283 grams of 2,2-bis(4-hydroxyphenyl)propane (mp 156°–157° C.; 10.0 mole grams), 5700 grams water, 9275 grams methylene chloride, 32.0 grams phenol (0.34 mole grams) and 10.0 grams triethylamine were introduced, at ambient temperature, 1180 grams phosgene over a period of 97 minutes while maintaining the pH of the two phase system at about 11; i.e., pH 10–12.5, by simultaneously adding a 25% aqueous sodium hydroxide solution. At the end of the addition period the pH of the aqueous phase was 11.7 and the bisphenol-A content of this phase was less than 1 part per million (ppm) as determined by ultraviolet analysis.

The methylene chloride phase was separated from the aqueous phase, washed with an excess of dilute (0.01N) aqueous HCl and then washed three times with deionized water. The polymer was precipitated by steam and dried at 95° C. The resultant, substantially pure bisphenol-A polycarbonate, which had an intrinsic viscosity (IV) in methylene chloride at 25° C. of 0.510 dl/g; was fed to an extruder, which extruder was operated at about 550° F., and the extrudate was comminuted into pellets. The pellets were then fed into a melt indexer and the flow rate of the polymer was measured according to ASTM D1238-70, Condition O. The melt flow rate is set forth in Table III. Additionally, the pellets were injection molded at about 315° C. into test specimens for impact strength determination according to the Izod test, ASTM D256, and for heat distortion by ASTM D648. The results of these tests are also set forth in Table III.

The sample labeled CONTROL in Table III is the polycarbonate resin of Example 1 which was prepared without the bishaloformates of the instant invention.

The following Examples illustrate the preparation of some of the bishaloformates useful in the practice of the instant invention.

EXAMPLE 2

Into a three-neck, one liter reaction flask, provided with a stirer, a dry-ice reflux condenser and a gas-inlet tube there were condensed from about three to five moles of phosgene (from 300 to 500 grams) with the aid of a cooling bath into which the flask was immersed. After the desired amount of phosgene was liquified in the reaction flask, the gas inlet tube was replaced by an addition funnel, from which one mole (90.12 grams) of 1,4-butanediol was added dropwise. The moderately exothermic reaction, in which the hydrogen chloride liberated was allowed to escape but the excess of phosgene was returned by the dry ice condenser, was regulated by both the rate of addition of the reactant and by cooling in the cooling bath. After the addition of the 1,4-butanediol was completed, in a period of from about one to two hours, excess phosgene was recovered by distillation, followed by distillation of the bischloroformate under vacuum. Some of the characteristic physical properties of the bischloroformate product, which was obtained in essentially quantitative yield, are set forth in Table II.

EXAMPLE 3

The procedure of Example 2 was repeated except that one mole (90.12 grams) of 2-methyl-1,3-propanediol was substituted for the 1,4-butanediol.

EXAMPLE 4

The procedure of Example 2 was repeated except that one mole (76.10 grams) of 1,3-propanediol was substituted for the 1,4-butanediol.

EXAMPLE 5

The procedure of Example 2 was repeated except that one mole (104.15 grams) of 2,2-dimethyl-1,3-propanediol was substituted for the 1,4-butanediol.

EXAMPLE 6

The procedure of Example 2 was repeated except that one mole (62.07 grams) of 1,2-ethanediol was substituted for the 1,4-butanediol.

EXAMPLE 7

The procedure of Example 2 was repeated except that one mole (166.18 grams) of triethylene glycol was substituted for the 1,4-butanediol.

EXAMPLE 8

The procedure of Example 2 was repeated except that one mole (178.19 grams) of bis(1,3-propanediol) carbonate was substituted for the 1,4-butanediol.

EXAMPLE 9

The procedure of Example 2 was repeated except that one mole (263.2 grams) of tetraethylene glycol was substituted for the 1,4-butanediol.

The data in Table II illustrates the bischloroformates obtained in Examples 2–9, as well as some of the physical properties of these bischloroformates.

The following examples illustrate the preparation of the polycarbonates of the instant invention utilizing some of the bischloroformates of the preceding examples as one of the coreactants.

EXAMPLE 10

The procedure of Example 1 was substantially repeated except that prior to the introduction of the phosgene 129 grams (0.6 mole) of the product of Example 2 was added gradually and the pH of the two-phase system was allowed to return to a value of about 11 by the addition of aqueous caustic solution via an automatic addition system. When addition of the bischloroformate was completed phosgenation was then carried out as outlined in Example 1. The reaction and work-up procedures were carried out as set forth in Example 1. Some of the physical properties of the resultant polymer are set forth in Table III.

EXAMPLES 11–21

The procedure of Example 10 was repeated with modifications in the amounts and types of the bischloroformate coreactants and in the amounts of phenol chain stopper utilized. The various bischloroformates and the amounts thereof utilized, as well as the amounts of the phenol chain stopper used, are set forth in Table III.

EXAMPLE 22

A blend of the polycarbonate of Example 11 and a bisphenol-A polycarbonate having an intrinsic viscosity of 0.54 was prepared by intimately blending, in a 1:1 weight ratio, the polycarbonate prepared in Example 11 with said bisphenol-A polycarbonate. The resultant blend had an intrinsic viscosity of 0.498 and a melt flow of 21.3 grams/10 minutes.

EXAMPLE 23

A blend of the polycarbonate of Example 13 and a polycarbonate of Example 18 was prepared by intimately blending, in a 2:1 weight ratio, the polycarbonate of Example 13 with a polycarbonate of Example 18. The resultant composition had a melt flow of 28.9 grams/10 minutes, a heat distortion temperature of 123.2° C., and a Notched Izod of 14.9 ft.lb./in.

EXAMPLE 24

This Example illustrates a polycarbonate falling outside the scope of the instant invention in that a relatively large amount of bischloroformate reactant is used. The resultant polycarbonate exhibits poor impact strength.

The procedure of Example 10 was substantially repeated except that 20 mole % of the bischloroformate of Example 6 was used with 3.6 mole % or a phenol chain stopper being utilized. The resultant polycarbonate had an intrinsic viscosity of 0.412, a heat distortion temperature of 122.2° C., a melt flow greater than 30 grams/10 minutes, and a Notched Izod of 2.2 ft.lb./in.

TABLE II

| Example No. | Bischloroformate | Boiling Point °C./mm pressure | Refractive Index $n_D/(T)$ |
|---|---|---|---|
| 2 | Cl—C(=O)—O—(CH$_2$)$_4$—O—C(=O)—Cl | 81–82/0.2 | 1.4520/23 |
| 3 | Cl—C(=O)—O—CH$_2$—CH(CH$_3$)—CH$_2$—O—C(=O)—Cl | 71–72/0.25 | 1.4490/20 |
| 4 | Cl—C(=O)—O—(CH$_2$)$_3$—O—C(=O)—Cl | 68–69/0.2 | 1.4520/20 |
| 5 | Cl—C(=O)—O—CH$_2$—C(CH$_3$)$_2$—CH$_2$—O—C(=O)—Cl | 65–66/0.15 | 1.4462/20 |
| 6 | Cl—C(=O)—O—(CH$_2$)$_2$—O—C(=O)—Cl | 44–46/0.01 | 1.4490/22 |
| 7 | Cl—C(=O)—O—(CH$_2$CH$_2$—O—)$_3$—C(=O)—Cl | 150–151/0.65 | 1.4556/22 |
| 8 | Cl—C(=O)—O—CH$_2$—CH$_2$—CH$_2$—O—...—C(=O)—O—CH$_2$—CH$_2$—CH$_2$—O—C(=O)—Cl | 162–165/0.9 | 1.4596/19 |
| 9 | Cl—C(=O)—O—(CH$_2$—CH$_2$—O—)$_4$—C(=O)—Cl | — | 1.4600/19 |

TABLE III

POLYCARBONATE PROPERTIES

| Example No. | Bischloroformate | Mole % Bischloroformate | Mole % Phenol | Intrinsic Viscosity | Melt Flow gr/10 min. | Notched Izod ft. lb./in. | DTUL* | Percent Ductility |
|---|---|---|---|---|---|---|---|---|
| 1 | — | 0 | 3.4 | 0.510 | 7.17 | 16.0 | 129.5 | 100 |
| 10 | Cl—C(=O)—O—(CH$_2$)$_4$—O—C(=O)—Cl | 6.0 | 3.4 | 0.486 | 25.4 | 15.9 | 123.4 | 100 |
| 11 | " | 6.0 | 3.6 | 0.475 | 28.2 | 16.2 | 123.3 | 100 |
| 12 | " | 2.0 | 4.0 | 0.477 | 18.9 | 15.8 | 125.8 | 100 |
| 13 | " | 8.0 | 3.4 | 0.487 | 30 | 15.5 | 123.7 | 100 |
| 14 | Cl—C(=O)—O—(CH$_2$)$_3$—O—C(=O)—Cl | 4.0 | 4.0 | 0.454 | 29 | 15.4 | 125.5 | 100 |
| 15 | Cl—C(=O)—O—(CH$_2$)$_2$—O—C(=O)—Cl | 4.0 | 4.0 | 0.447 | 25.6 | 15.3 | 127.0 | 100 |
| 16 | Cl—C(=O)—O—CH$_2$—CH(CH$_3$)—CH$_2$—O—C(=O)—Cl | 4.0 | 4.0 | 0.440 | 28.0 | 14.8 | 125.8 | 100 |
| 17 | Cl—C(=O)—O—CH$_2$—C(CH$_3$)$_2$—CH$_2$—O—C(=O)—Cl | 3.1 | 3.8 | 0.481 | 18.4 | 13.8 | 125.2 | 100 |
| 18 | Cl—C(=O)—O—(CH$_2$—CH$_2$—O—)$_3$—C(=O)—Cl | 4.0 | 3.4 | 0.472 | 26.6 | 7.2 | 119.4 | 40 |

TABLE III-continued

| | POLYCARBONATE PROPERTIES | | | | | | | |
|---|---|---|---|---|---|---|---|---|
| Example No. | Bischloroformate | Mole % Bis-chloro-formate | Mole % Phenol | Intrinsic Viscosity | Melt Flow gr/10 min. | Notched Izod ft. lb./in. | DTUL* | Percent Ductility |
| 19 | 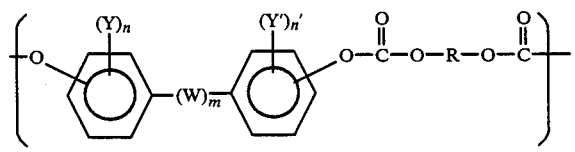 | 4.0 | 3.8 | 0.465 | 22.4 | 15.3 | 126.3 | 100 |
| 20 | " | 4.0 | 4.0 | 0.461 | 23.8 | 14.3 | 127.1 | 100 |
| 21 | 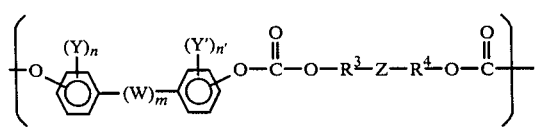 | 2.0 | 3.4 | 0.488 | 22.0 | 13.2 | 120.2 | 80 |

*Heat Distortion Temperature Under Load at 264 psi.

As illustrated by the data in Table III the polycarbonates of the instant invention, i.e., those prepared in accordance with the procedures of Examples 10-21, have an improved processability (higher flow rate) as compared with the prior art polycarbonates, i.e., that prepared in accordance with the procedure of Example 1. The polycarbonates of the instant invention exhibit improved processability while simultaneously retaining substantially most of their other advantageous physical properties such as Heat Distortion Temperatures and Notched Izod.

What is claimed is:

1. High molecular weight thermoplastic aromatic polycarbonate exhibiting improved processability consisting essentially of at least one recurring structural unit represented by the general formula

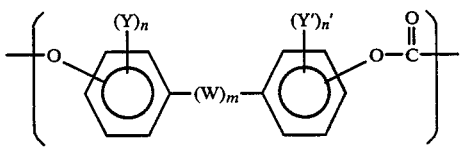

and at least one recurring structural unit represented by the general formula

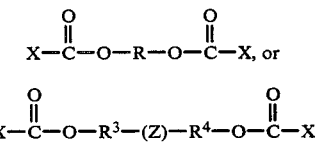

or at least one recurring structural unit represented by the general formula

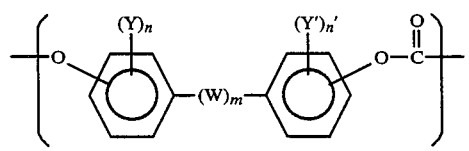

and at least one recurring structural unit represented by the general formula

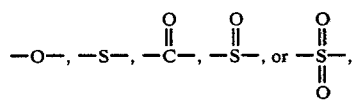

derived from (i) a carbonyl halide carbonate precursor; (ii) at least one dihydric phenol; and (iii) at least one bishaloformate selected from bishaloformates represented by the general formulae $$X-\overset{O}{\underset{\|}{C}}-O-R-O-\overset{O}{\underset{\|}{C}}-X, \text{ or}$$

$$X-\overset{O}{\underset{\|}{C}}-O-R^3-(Z)-R^4-O-\overset{O}{\underset{\|}{C}}-X$$

wherein:

Y is independently selected from halogen, monovalent hydrocarbon or monovalent hydrocarbonoxy radicals, Y' is independently selected from halogen, monovalent hydrocarbon or monovalent hydrocarbonoxy radicals, W is selected from divalent hydrocarbon radicals, $$-O-, -S-, -\overset{O}{\underset{\|}{C}}-, -\overset{O}{\underset{\|}{S}}-, \text{ or } -\overset{O}{\underset{\underset{\|}{O}}{\overset{\|}{S}}}-,$$

n and n' are independently selected from whole numbers having a value of from 0 to 4 inclusive, m is either zero or one, X is independently selected from chlorine or bromine radicals, R is selected from alkylene radicals, cycloalkylene radicals, or divalent radicals represented by the general formula

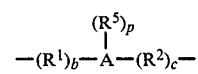

wherein $R^1$ and $R^2$ are independently selected from alkylene radicals, $R^5$ is independently selected from alkyl radicals, A represents a cycloalkylene radical, the letters b and c are independently selected from zero or one, with the proviso that the sum of b and c is at least one, and p represents a whole number having a value of from zero up to the number of replaceable hydrogen atoms present on A, $R^3$ and $R^4$ are independently selected from alkylene radicals, and Z is selected from the following divalent radicals

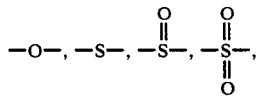

the $—(R^6)_d—Ar—(R^7)_e—$ radical wherein Ar represents a divalent mono, di- or polynuclear aromatic residue, $R^6$ and $R^7$ are independently selected from alkylene radicals, and the letters d and e are independently selected from zero or one, or a divalent organic aliphatic hetero noncyclic radical containing at least one carbon atom and at least one hetero group selected from

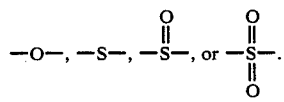

2. The polycarbonate of claim 1 consisting essentially of at least one recurring structural unit represented by the general formula

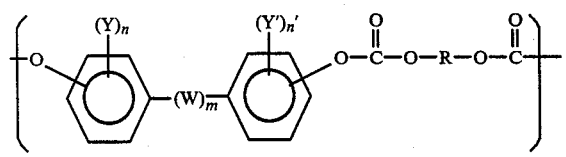

and at least one recurring structural unit represented by the general formula

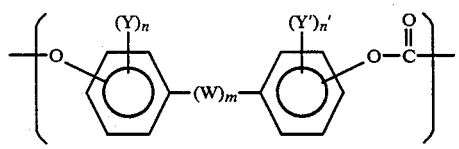

and wherein said bishaloformate is selected from bishaloformates represented by the general formula

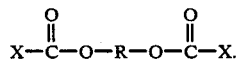

3. The polycarbonate of claim 2 wherein R represents an alkylene radical containing from 1 to about 30 carbon atoms.

4. The polycarbonate of claim 2 wherein R represents a cycloalkylene radical containing from 4 to about 30 carbon atoms.

5. The polycarbonate of claim 2 wherein R represents a divalent radical represented by the general formula

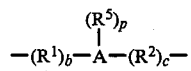

wherein A represents a cycloalkylene residue containing from 4 to 16 carbon atoms, $R^1$ and $R^2$ are independently selected from alkylene radical containing from 1 to about 20 carbon atoms, and p is a whole number having a value of from 0 to 4 inclusive.

6. The polycarbonate of claim 1 consisting essentially of at least one recurring structural unit represented by the general formula

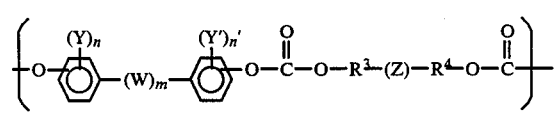

and at least one recurring structural unit represented by the general formula

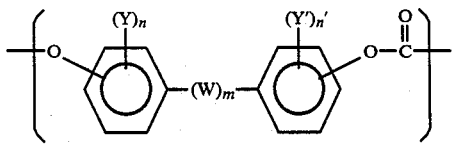

and wherein said bishaloformate is selected from bishaloformates represented by the general formula

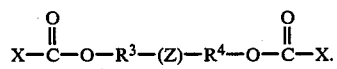

7. The polycarbonate of claim 6 wherein $R^3$ and $R^4$ are independently selected from alkylene radicals containing from 1 to about 30 carbon atoms.

8. The polycarbonate of claim 7 wherein $R^6$ and $R^7$ are independently selected from alkylene radicals containing from 1 to about 30 carbon atoms and Ar is selected from phenylene radicals, lower alkyl substituted phenylene radicals, biphenylene radicals, or lower alkyl substituted biphenylene radicals.

9. The polycarbonate of claim 7 wherein said divalent organic aliphatic hetero non-cyclic radical is selected from polyether residues represented by the general formula

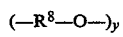

wherein $R^8$ represents an alkylene radical and y is a number having a value of from 2 to about 350.

10. The polycarbonate of claim 9 wherein $R^8$ is selected from lower alkylene radicals containing from 1 to about 5 carbon atoms.

11. The polycarbonate of claim 1 wherein said bishaloformate reactant is present in an amount effective to improve the processability of the carbonate polymer but insufficient to substantially deleteriously affect the advantageous properties of said carbonate polymer.

12. The polycarbonate of claim 11 wherein said bishaloformate reactant is present in an amount of from about 0.1 to about 15 mole percent, based on the amount of dihydric phenol reactant present.

13. The polycarbonate of claim 12 wherein said bishaloformate reactant is present in an amount of from about 1 to about 10 mole percent, based on the amount of dihydric phenol reactant present.

14. The polycarbonate of claim 13 which contain admixed therewith a flame retardant amount of at least one flame retardant compound.

* * * * *